United States Patent
Amano et al.

(10) Patent No.: US 7,785,090 B2
(45) Date of Patent: Aug. 31, 2010

(54) INJECTION CONTROL APPARATUS

(75) Inventors: Mitsuaki Amano, Chiba (JP); Tatsuya Shibata, Chiba (JP); Ikuo Koumaru, Tokyo (JP)

(73) Assignees: Sumitomo Heavy Industries, Ltd., Tokyo (JP); Sony Corporation, Tokyo (JP)

( * ) Notice: Subject to any disclaimer, the term of this patent is extended or adjusted under 35 U.S.C. 154(b) by 227 days.

(21) Appl. No.: 12/073,414

(22) Filed: Mar. 5, 2008

(65) Prior Publication Data

US 2008/0226762 A1  Sep. 18, 2008

(30) Foreign Application Priority Data

Mar. 6, 2007  (JP) .............................. 2007-056093

(51) Int. Cl.
B29C 45/77 (2006.01)
(52) U.S. Cl. .................. 425/145; 264/40.7; 425/149; 425/150
(58) Field of Classification Search .............. 425/145, 425/149, 150; 264/40.7
See application file for complete search history.

(56) References Cited

U.S. PATENT DOCUMENTS 5,688,535 A * 11/1997 Koda et al. ............... 425/145
5,817,258 A   10/1998 Ito et al.
2002/0192322 A1  12/2002 Tsutsui et al.

FOREIGN PATENT DOCUMENTS

CN        1394162        1/2003

* cited by examiner

Primary Examiner—Tim Heitbrink
(74) Attorney, Agent, or Firm—Squire, Sanders & Dempsey, LLP

(57) ABSTRACT

An injection control apparatus includes an injection member; a drive section for injection; an injection-speed detection processing section which detects injection speed; an injection-pressure detection processing section which detects injection pressure; and a drive control processing section which drives the drive section for injection on the basis of the injection speed and the injection pressure to thereby perform pressure control before start of charging of a molding material into a cavity, and speed control after the start of charging of the molding material into the cavity. Since the drive section is driven on the basis of the injection speed and the injection pressure such that pressure control is performed before start of charging of a molding material into a cavity, and speed control is performed thereafter, the pressure of the cavity after the molding material has entered the cavity becomes stable and uniform.

3 Claims, 8 Drawing Sheets

INJECTION CONTROL APPARATUS

BACKGROUND OF THE INVENTION

1. Field of the Invention

The present invention relates to an injection control apparatus.

2. Description of the Related Art

Conventionally, a molding machine; for example, an injection molding machine, includes a mold apparatus, a mold-clamping apparatus, and an injection apparatus. The mold apparatus includes a stationary mold and a movable mold. The mold-clamping apparatus advances and retreats the movable mold to thereby perform mold closing, mold clamping, or mold opening of the mold apparatus. As a result of mold clamping, a cavity is formed between the stationary mold and the movable mold. Meanwhile, the injection apparatus includes a heating cylinder, and a screw which is disposed in the heating cylinder such that the screw can rotate, advance, and retreat. The injection apparatus includes a metering motor, an injection motor, etc. so as to rotate and advance the screw. When the screw is rotated in a metering step, resin is accumulated forward of the screw within the heating cylinder. When the screw is advanced in an injection step, the accumulated resin is injected from an injection nozzle attached to the front end of the heating cylinder. The resin flows through a runner within the mold apparatus, and then enters the cavity via a gate, whereby the resin is charged into the cavity. The charged resin is cooled and solidified through cooling of the mold apparatus, whereby a molded product is yielded.

Incidentally, there has been proposed an injection control apparatus which controls charging of resin while switching the control mode between speed control and pressure-restricting control in order to inject the resin at high speed and under high pressure (see, for example, Japanese Patent Application Laid-Open (kokai) No. H6-55599).

Figure 1:
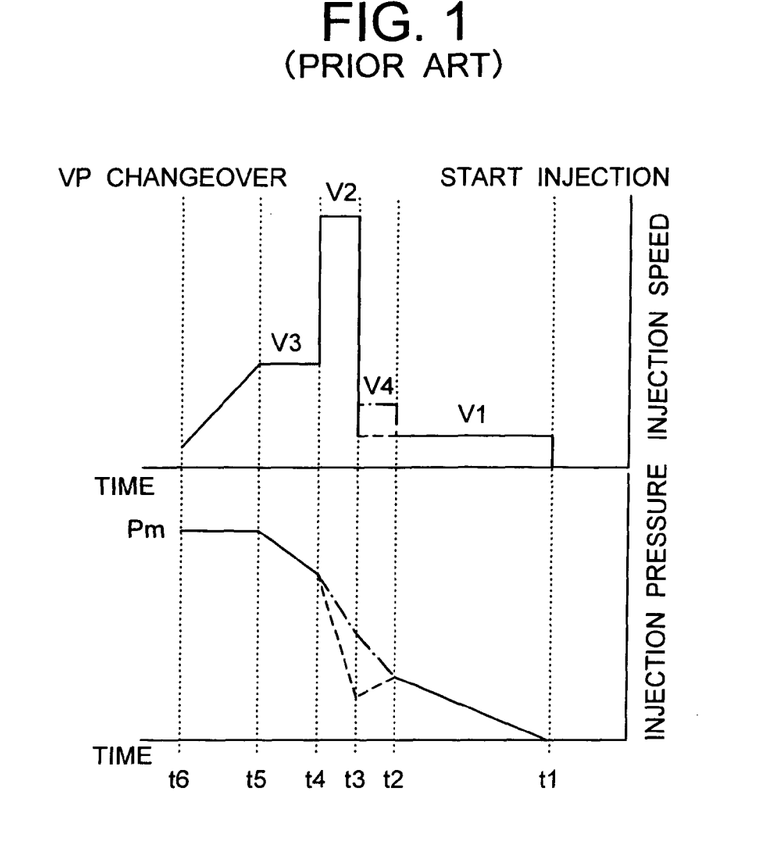
FIG. 1 is a time chart showing a first charging method employed by a conventional injection apparatus.
Figure 2:
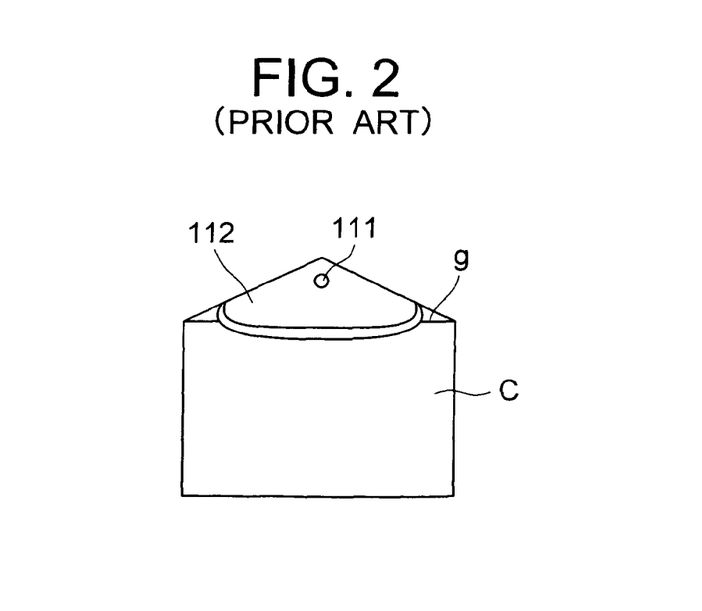
FIG. 2 is a first view showing pressure distribution within a runner as measured in the conventional injection apparatus.
Figure 3:
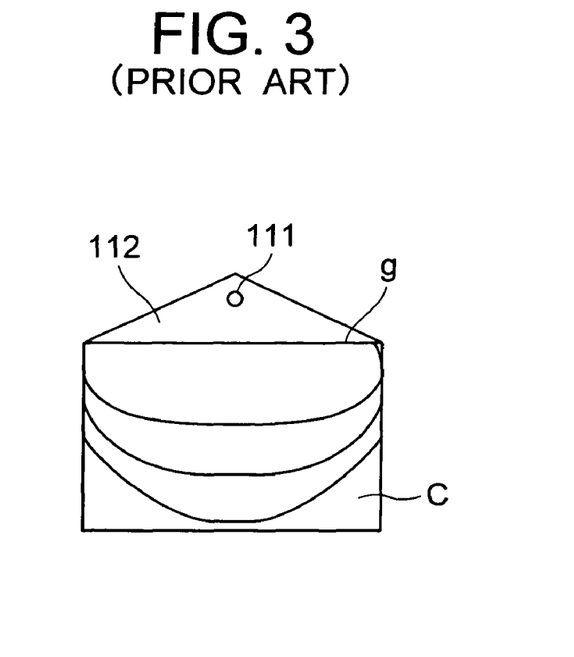
FIG. 3 is a first view showing pressure distribution within a cavity as measured in the conventional injection apparatus.
Figure 4:
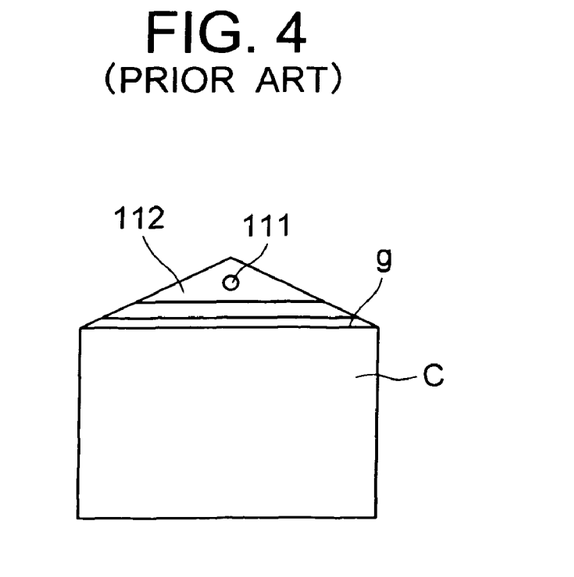
FIG. 4 is a second view showing pressure distribution within the runner as measured in the conventional injection apparatus.
Figure 5:
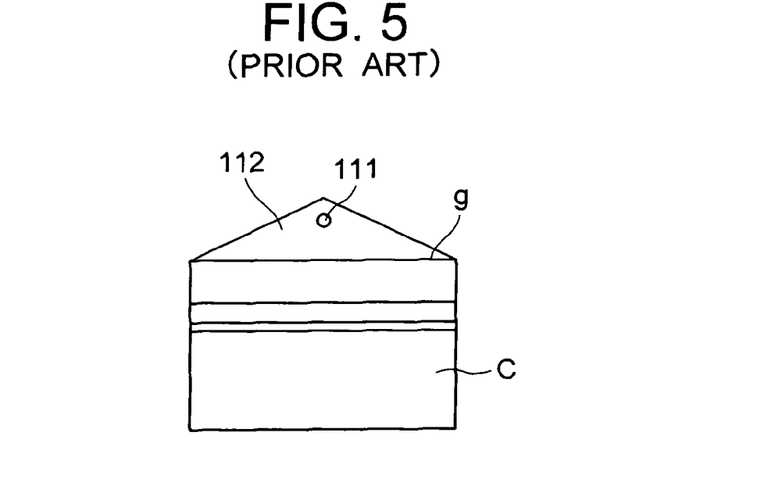
FIG. 5 is a second view showing a pressure distribution within the cavity as measured in the conventional injection apparatus.
Figure 6:
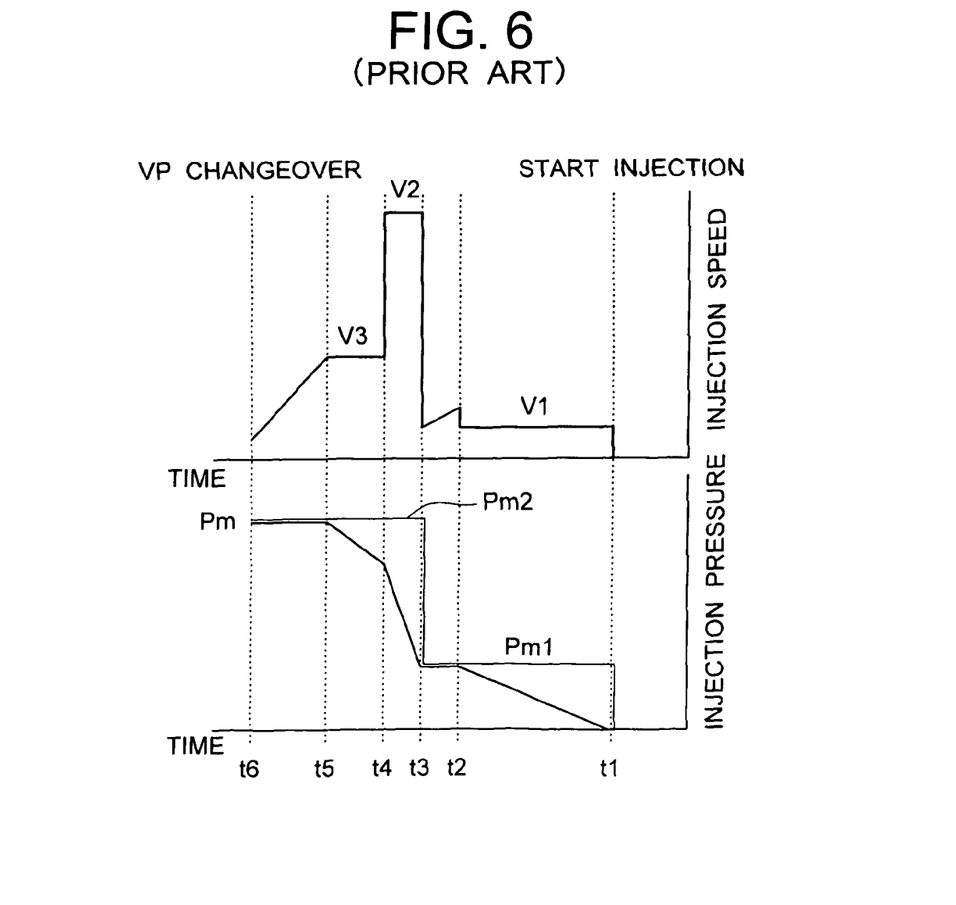
FIG. 6 is a time chart showing a second charging method employed by the conventional injection apparatus.

FIG. 1 is a time chart showing a first charging method employed by a conventional injection apparatus; FIG. 2 is a first view showing pressure distribution within a runner as measured in the conventional injection apparatus; FIG. 3 is a first view showing pressure distribution within a cavity as measured in the conventional injection apparatus; FIG. 4 is a second view showing pressure distribution within the runner as measured in the conventional injection apparatus; FIG. 5 is a second view showing a pressure distribution within the cavity as measured in the conventional injection apparatus; and FIG. 6 is a time chart showing a second charging method employed by the conventional injection apparatus.

In the first charging method, as shown in FIG. 1, when injection is started at timing t1, velocity control is started, whereby resin fills a sprue 111 and a gate 112 of a mold apparatus (see FIG. 2) at a speed corresponding to a constant injection speed V1, with the consequence that injection pressure gradually increases. Notably, the injection speed is represented by speed of a screw, and the injection pressure is represented by force with which the screw is pushed.

Subsequently, the resin enters a gate narrow portion g at timing t2, and the resin fills the gate narrow portion g at timing t3. When the resin having passed through the gate narrow portion g enters a cavity C, the injection speed is increased sharply to V2 (V1<V2), with the consequence that the injection pressure increases sharply. When the charging of the resin into the cavity C ends at timing t4, in order to prevent generation of a sink mark, burr, etc., the injection speed is reduced to V3 (V1<V3<V2), with the consequence that the increase rate of the injection pressure decreases. Next, when the speed control is ended and pressure-restricting control is started at timing t5, the injection pressure is restricted not to exceed a restriction value Pm, with the consequence that the injection speed gradually decreases. At timing t6, VP changeover is performed, pressure-holding is started, and the control mode is switched from the pressure-restricting control to pressure control.

Incidentally, in the case where the above-described speed control is performed such that the injection speed is controlled stepwise; i.e., stepwise speed control is performed, the injection speed in the period between timings t2 and t3 may be increased to V4 (V1<V4<V3<V2) as indicated by an alternate long and short dash line in FIG. 1. In this case, the injection pressure increases as indicated by an alternate long and short dash line. As a result, as shown in FIG. 2, the pressure within the gate 112, which gradually expands toward a cavity C, becomes instable and non-uniform. In addition, when the resin fills the gate 112 at timing t3, a portion of the resin flows into the cavity C.

Further, even after the resin has entered the cavity C at timing t3, as shown in FIG. 3, the pressure within the cavity C becomes instable and non-uniform.

As a result, a molded product may involve a defect such as uneven thickness, distortion, warpage, etc., or gas may be generated in the cavity C.

In order to overcome the above-mentioned drawback, the injection speed in the period between timings t2 and t3 may be made equal to the injection speed V1 employed up to timing t2, as indicated by a broken line in FIG. 1. However, in this case, the injection speed gradually decreases in the period between timings t2 and t3, so that resin cannot be caused to smoothly fill the gate 112 as shown in FIG. 4, and a sufficient amount of resin cannot be charged into the cavity C as shown in FIG. 5.

In view of the above-mentioned problem, a second charging method as shown in FIG. 6 has been proposed. In this case, speed control and pressure-restricting control are performed during a period between timings t1 to t6; and the injection pressure is restricted such that the injection pressure does not exceed a restriction value Pm1 during a period between timings t1 to t3 and a restriction value Pm2 during a period between timings t3 to t6.

When injection is started at timing t1, velocity control is started, whereby resin fills the sprue 111 and the gate 112 at a speed corresponding to a constant injection speed V1, with the consequence that injection pressure gradually increases.

Subsequently, although the resin enters the gate 112 at timing t2, the injection pressure is restricted not to exceed the restriction value Pm1, because the pressure-restricting control is performed. In consideration of this, at timing t2, the injection speed is increased by a predetermined amount such that the injection pressure becomes the restriction value Pm1.

Next, when the resin fills the gate narrow portion g at timing t3 and the resin having passed through the gate narrow portion g enters the cavity C, the injection speed is sharply increased to V2 as described above, with the consequence that the injection pressure increases sharply.

In the conventional second charging method, since the injection pressure is restricted not to exceed the restriction value Pm1, the injection speed is gradually decreased, and, at timing t3, becomes approximately equal to the injection speed V1.

Accordingly, resin cannot be caused to smoothly fill the gate 112 as shown in FIG. 4, and a sufficient amount of resin cannot be charged into the cavity C as shown in FIG. 5. As a result, molded products involve defects such as formation of a sink mark.

SUMMARY OF THE INVENTION

An object of the present invention is to solve the above-mentioned problems in the conventional charging methods, and to provide an injection control apparatus which prevents generation of defects in molded products and generation of gas in a cavity.

In order to achieve the above object, an injection control apparatus according to the present invention comprises an injection member; a drive section for injection which advances and retreats the injection member; an injection-speed detection processing section which detects injection speed when injection is performed through advancement of the injection member; an injection-pressure detection processing section which detects injection pressure when injection is performed; and a drive control processing section which drives the drive section for injection on the basis of the injection speed and the injection pressure to thereby perform pressure control before start of charging of a molding material into a cavity, and speed control after the start of charging of the molding material into the cavity.

In the present invention, the drive section for injection is driven on the basis of the injection speed and the injection pressure, whereby pressure control is performed before start of charging of a molding material into a cavity, and speed control is performed after the start of charging of the molding material into the cavity. Therefore, the pressure of the cavity after the molding material has entered the cavity becomes stable and uniform.

As a result, molded products are free from defects such as uneven thickness, distortion, warpage, etc., and gas is not generated in the cavity.

Further, since a sufficient amount of a molding material can be charged into the cavity, generation of a sink mark or a like defect in molded products can be prevented.

DESCRIPTION OF SYMBOLS

12: screw
28: injection motor
54: amplifier
55: control section
57: load cell amplifier
58: servo amplifier
61: differentiator
62, 65, 68: subtractor
63: command value generator
66: position control compensator
67: position pattern generator
69: pressure control compensator
C: cavity
Sd, Sd1, Sd2, Sd3: injection speed
Sp: injection pressure

DESCRIPTION OF THE PREFERRED EMBODIMENT

An embodiment of the present invention will next be described in detail with reference to the drawings. Notably, in the following description, there will be described an injection molding machine, which is one type of a molding machine.

Figure 7:
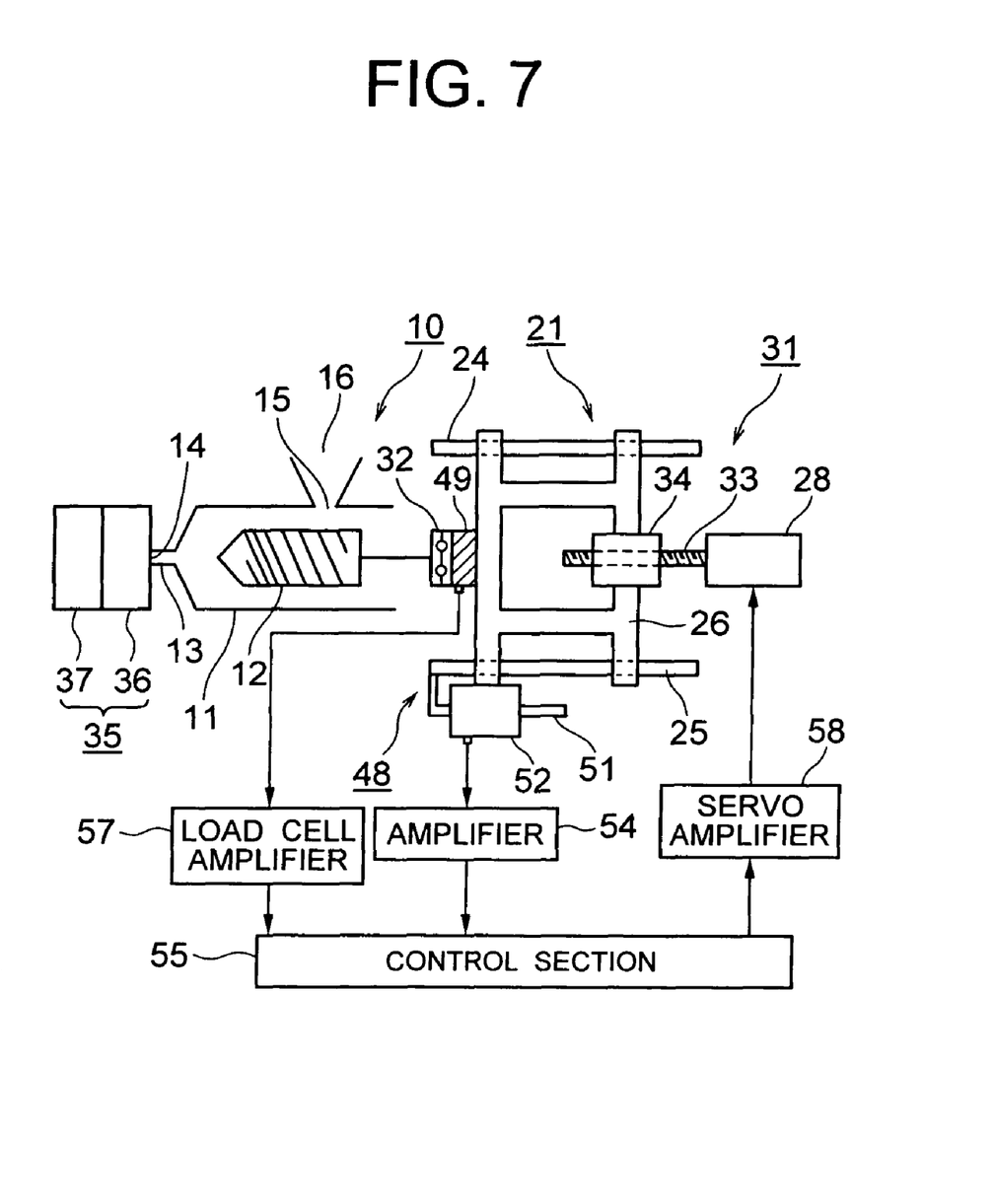
FIG. 7 is a view showing a main portion of an injection molding machine according to an embodiment of the present invention.
Figure 8:
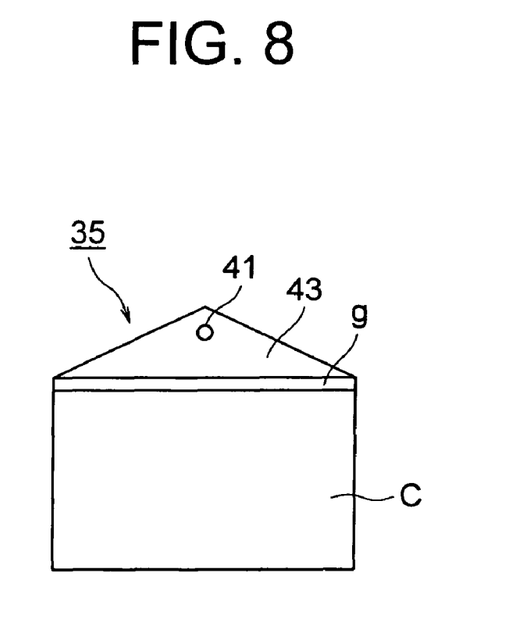
FIG. 8 is a first view relating to the embodiment of the present invention and showing a state within a mold apparatus.
Figure 9:
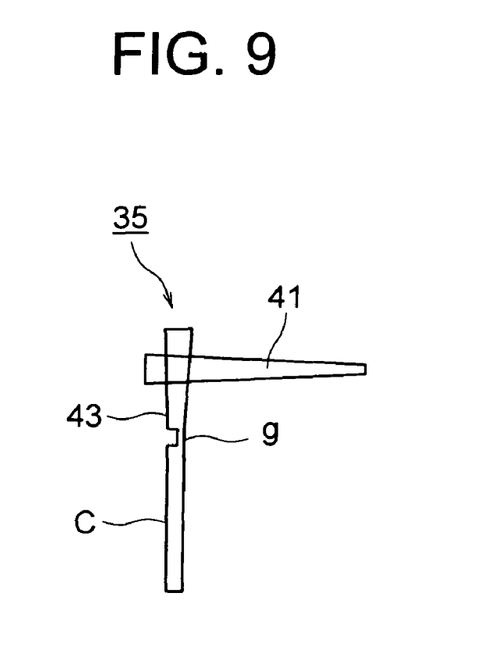
FIG. 9 is a second view relating to the embodiment of the present invention and showing the state within the mold apparatus.

FIG. 7 is a view showing a main portion of an injection molding machine according to the embodiment of the present invention; FIG. 8 is a first view relating to the embodiment of the present invention and showing a state within a mold apparatus; and FIG. 9 is a second view relating to the embodiment of the present invention and showing the state within the mold apparatus.

In the drawings, reference numeral 10 denotes an injection apparatus; 11 denotes a heating cylinder (a cylinder member); 12 denotes a screw (an injection member) disposed in the heating cylinder 11 such that the screw can rotate, advance, and retreat; 13 denotes an injection nozzle attached to the front end of the heating cylinder 11; 14 denotes a nozzle opening formed in the injection nozzle 13; 15 denotes a supply port provided on the heating cylinder 11 at a predetermined location near the rear end thereof and adapted to supply unillustrated resin (a molding material); and 16 denotes a hopper (a molding-material supply member) which stores the resin and supplies the resin to the interior of the heating cylinder 11 through the supply port 15.

A drive apparatus section 21 is disposed at the rear end of the screw 12 so as to rotate, advance, and retreat the screw 12. The drive apparatus section 21 includes guide bars (guide members) 24 and 25 fixed to an unillustrated frame; a slide base (a support member) 26 guided by the guide bars 24 and 25 for advancing and retreating movement in relation to the frame; an unillustrated metering motor (a drive section for metering) fixed to the slide base 26; an unillustrated rotation transmission system for transmitting, to the screw 12, rotation generated through drive of the metering motor; an injection motor (a drive section for injection) 28 fixed to the frame; a ball screw (a motion-direction conversion section) 31 for converting rotational motion generated through drive of the injection motor 28 to rectilinear motion and for transmitting the rectilinear motion to the screw 12 via the slide base 26; a bearing 32 for supporting the screw 12 such that the screw 12 can rotate in relation to the slide base 26; etc.

The ball screw 31 includes a ball screw shaft (a first conversion element) 33 connected to an output shaft of the injection motor 28, and a ball nut (a second conversion element) 34 attached to the slide base 26 and meshing with the ball screw shaft 33.

A mold apparatus 35 is disposed in front of the injection apparatus 10. The mold apparatus 35 is composed of a stationary mold (a first mold) 36, and a movable mold (a second mold) 37 disposed such that it can be advanced toward the stationary mold 36 and retreated away from the stationary mold 36. Through operation of an unillustrated mold clamping apparatus, the mold apparatus 35 is closed, clamped, and opened. When the mold apparatus 35 is clamped, a cavity C is formed between the stationary mold 36 and the movable mold 37. For such operation, the mold clamping apparatus includes an unillustrated stationary platen to which the stationary mold 36 is attached; an unillustrated movable platen to which the movable mold 37 is attached; an unillustrated mold clamping motor (a drive section for mold clamping) for advancing and retreating the movable platen and generating a mold clamping force; etc.

When the screw 12 is rotated in a regular direction through drive of the metering motor in a metering step, the resin within the hopper 16 is supplied to the interior of the heating cylinder 11 via the supply port 15, and is caused to move forward along the groove of the screw 12. With this, the screw 12 is retreated, and the resin is accumulated forward of an unillustrated screw head at the front end of the screw 12.

When the screw 12 is advanced through drive of the injection motor 28 in an injection step, the resin accumulated forward of the screw head is injected from the injection nozzle 13 and flows through a sprue 41 within the mold apparatus 35, then through a gate 43, and enters the cavity C via a gate narrow portion g, whereby the resin is charged into the cavity C.

The injection apparatus 10 having the above-described configuration can control injection speed and injection pressure. For such control, a position detector 48 is disposed between the guide bar 25 and the slide base 26, and a load cell (a load detector) 49 is disposed between the screw 12 and the slide base 26.

The position detector 48 includes a stationary element (a first detection element) 51 attached to the guide bar 25, and a movable element (a second detection element) 52 attached to the slide base 26. A sensor output of the movable element 52, which represents the position of the screw 12, is fed to a control section 55 via an amplifier 54. Further, a sensor output of the load cell 49, which represents the load transmitted to the slide base 26 when the injection motor 28 is driven, is fed to the control section 55 via a load cell amplifier 57.

The control section 55 drives the injection motor 28 via a servo amplifier 58. Notably, the amplifier 54, the control section 55, the load cell amplifier 57, the servo amplifier 58, etc. constitute an injection control apparatus.

Next, the injection control apparatus will be described.

Figure 10:
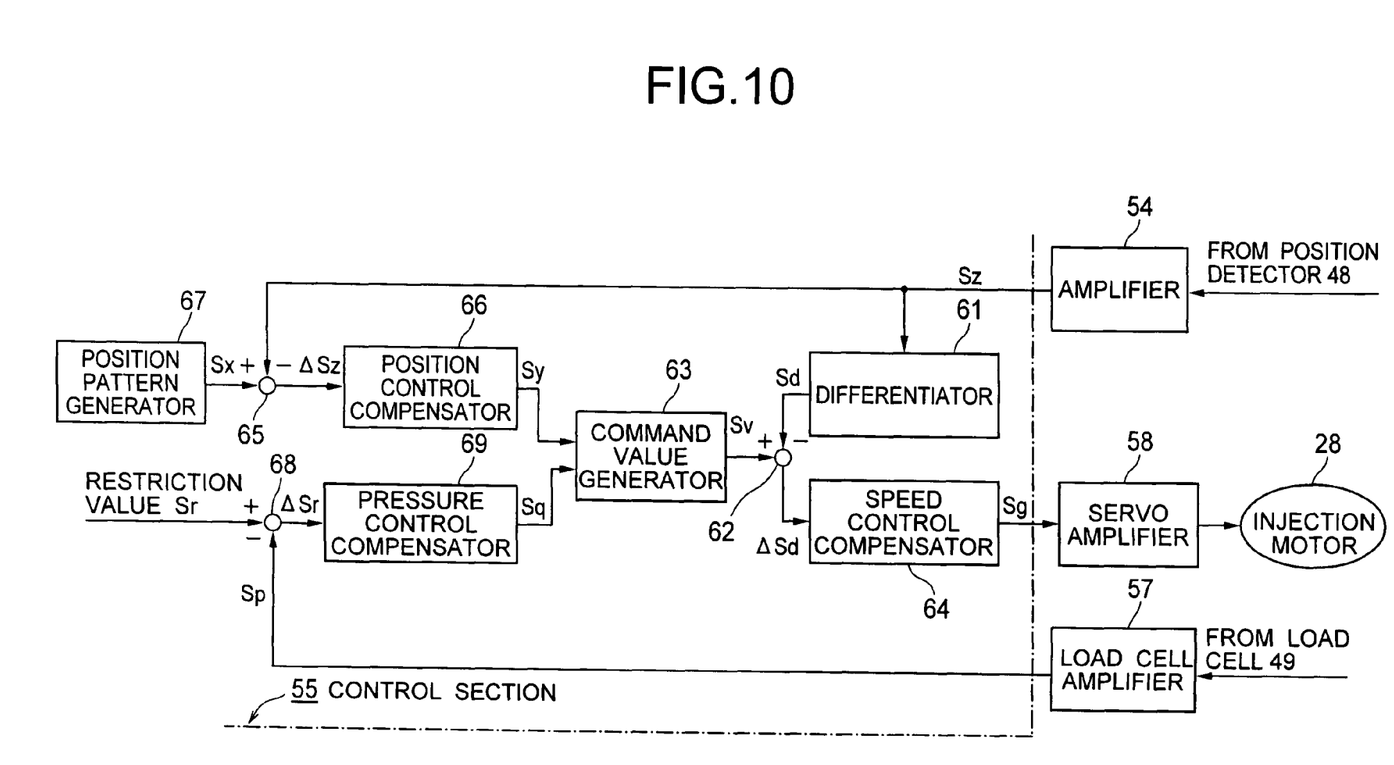
FIG. 10 is a control block diagram of an injection control apparatus according to the embodiment of the present invention.

FIG. 10 is a control block diagram of the injection control apparatus according to the embodiment of the present invention.

In FIG. 10, reference numeral 55 denotes the control section, and the control section 55 includes an unillustrated CPU, an unillustrated storage apparatus, etc. The control section 55 carries out various types of computations on the basis of a program, data, etc. recorded in the storage apparatus and functions as a computer.

When the sensor output of the movable element 52 is sent to the control section 55 via the amplifier 54 as a position Sz, a differentiator 61, which serves as injection-speed detection processing means (an injection-speed detection processing section), performs injection-speed detection processing. That is, the differentiator 61 receives the position Sz, differentiates it so as to calculate an injection speed Sd, and sends the injection speed Sd to a subtractor 62, which serves as speed-deviation calculation processing means (a speed-deviation calculation processing section). The subtractor 62 performs speed-deviation calculation processing. That is, for feedback control, the subtractor 62 subtracts the injection speed Sd from a speed command Sv sent from a command value generator 63, which serves as control switching processing means (a control switching processing) and command-value generation processing means (a command-value generation processing section), so as to obtain a speed deviation ΔSd, and sends the speed deviation ΔSd to a speed control compensator 64, which serves as speed-control compensation processing means (a speed-control compensation processing section) and command-value generation processing means (a command-value generation processing section).

The speed control compensator 64 performs speed-control compensation processing and command-value generation processing. That is, the speed control compensator 64 performs compensation operation for the speed deviation ΔSd, generates a current (torque) command value Sg, and supplies the current command value Sg to the injection motor 28 via the servo amplifier 58, to thereby drive the injection motor 28. Notably, various operations for proportional control, proportional-integral control, etc., are performed in the speed control compensator 64.

The position detector 48, the amplifier 54, the differentiator 61, the subtractor 62, the speed control compensator 64, the servo amplifier 58, and the injection motor 28 constitutes a speed minor feedback system which is shared by speed control and pressure control to be described later. The differentiator 61, the subtractor 62, the command value generator 63, and the speed control compensator 64 constitute speed control processing means (a speed control processing section). The speed control processing means performs speed control processing so as to control the injection speed Sd.

A position pattern generator 67, which serves as position setting processing means (a position setting processing section), performs position setting processing so as to send a position Sx, which changes with time, to a subtractor 65, which serves as position-deviation calculation processing means (a position-deviation calculation processing section), such that the moving speed of the screw 12 coincides with the injection speed.

The subtractor 65 performs position-deviation calculation processing. That is, for feedback control, the subtractor 65 subtracts from the position Sx the position Sz sent via the amplifier 54 so as to obtain a positional deviation ΔSz, and sends the positional deviation ΔSz to a position control compensator 66, which serves as position-control compensation processing means (a position-control compensation processing section). The position control compensator 66 performs position-control compensation processing; i.e., performs compensation operation for the positional deviation ΔSz, generates a control input Sy of a position control system, and sends the control input Sy to the command value generator 63. Notably, various operations for proportional control, proportional-integral control, etc., are performed in the position control compensator 66. The position pattern generator 67, the subtractor 65, the position control compensator 66, and the command value generator 63 constitute position control processing means (a position control processing section). The position control processing means performs position control processing so as to control the position Sz.

Incidentally, in an injection molding machine of this type, the injection pressure Sp is restricted to a restriction value Sr when resin is charged, so as to prevent imposition of excessive pressure to the mold apparatus 35 in an injection step, to reduce a change in pressure at the time of switching from the injection step to a pressure-holding step, or to enable the determination of switching from the injection step to the pressure-holding step to be performed at the time of high speed injection without depending on load pressure. For such operation, an unillustrated restriction value generator is provided as restriction-value generation processing means (a restriction-value generation processing section). The restriction value generator generates the restriction value Sr.

The sensor output of the load cell 49 is input to the control section 55 via the load cell amplifier 57 as the injection pressure Sp, and is sent to a subtractor 68, which serves as unillustrated injection-pressure detection processing means (an injection-pressure detection processing section) and pressure-deviation calculation processing means (a pressure-deviation calculation processing section), of the control section 55. The subtractor 68 performs injection-pressure detection processing and pressure-deviation calculation processing. That is, the subtractor 68 detects the injection pressure Sp, and, for feedback control, subtracts the injection pressure Sp from the restriction value Sr so as to obtain a pressure deviation $\Delta Sr$, which is sent to a pressure control compensator 69, which serves as pressure-control compensation processing means (a pressure-control compensation processing section). The pressure control compensator 69 performs pressure-control compensation processing; i.e., performs compensation operation for the pressure deviation $\Delta Sr$, generates a control input Sq of a pressure control system, and sends the control input Sq to the command value generator 63. Notably, various operations for proportional control, proportional-integral control, etc., are performed in the pressure control compensator 69. The subtractor 68 and the pressure control compensator 69 constitute pressure control processing means (a pressure control processing section). The pressure control processing means performs pressure control processing so as to control the injection pressure Sp.

In a manner as described above, the control inputs Sy and Sq are sent to the command value generator 63. At that time, the control inputs Sy and Sq serve as a velocity setting for the speed minor feedback system. The command value generator 63 performs control switching processing and command-value generation processing to thereby select one of the control inputs Sy and Sq and send the selected input to the speed minor feedback system as a speed command Sv.

Incidentally, in order to simplify the description, the position control compensator 66 is assumed to be a proportional compensator of a gain K0 and to perform proportional control, and the pressure control compensator 69 is assumed to be a proportional compensator of a gain K1 and to perform proportional control. In this case, the control inputs Sy and Sq are represented as follows.

$$Sy = K0 \cdot \Delta Sz$$
$$= K0(Sx - Sz)$$
$$Sq = K1 \cdot \Delta Sr$$
$$= K1(Sr - Sp)$$

Notably, the subtractors 62, 65, and 68, the command value generator 63, the position control compensator 66, the position pattern generator 67, the pressure control compensator 69, etc. constitute drive control processing means (a drive control processing section), which performs drive control processing so as to drive the injection motor 28 on the basis of the injection speed Sd and the injection pressure Sp to thereby perform speed control, pressure control, pressure-restricting control, etc.

Next, there will be described a charging method employed by the injection apparatus 10 having the above-described structure.

Figure 11:
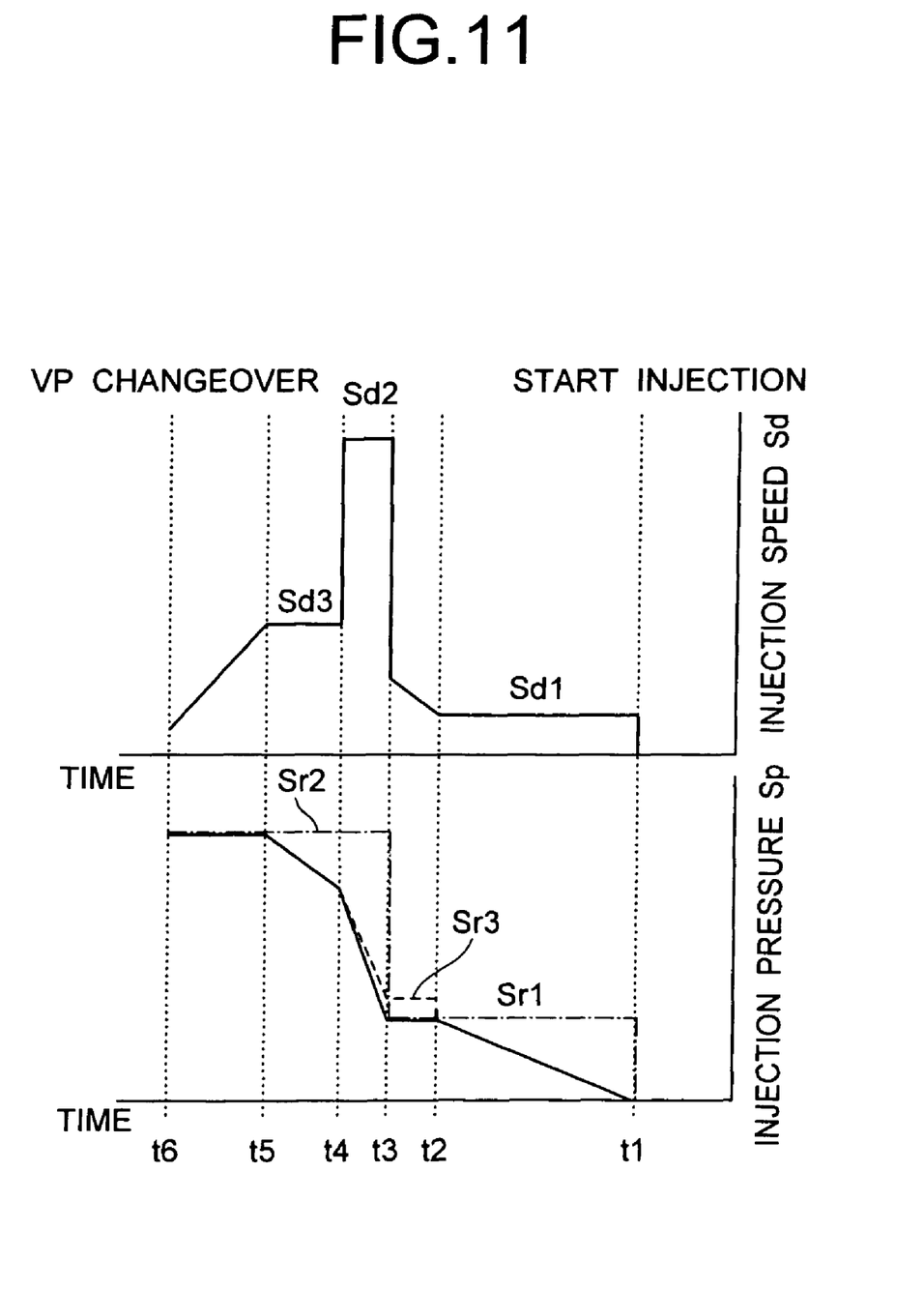
FIG. 11 is a time chart showing a charging method according to the embodiment of the present invention.
Figure 12:
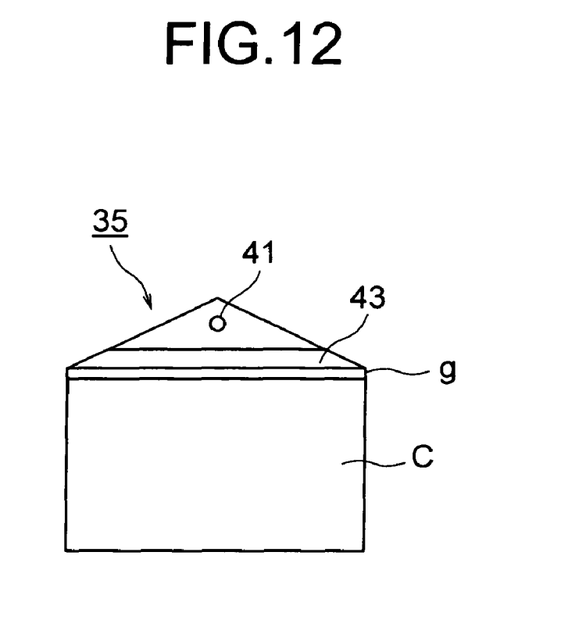
FIG. 12 is a view relating to the embodiment of the present invention and showing pressure distribution within a runner.
Figure 13:
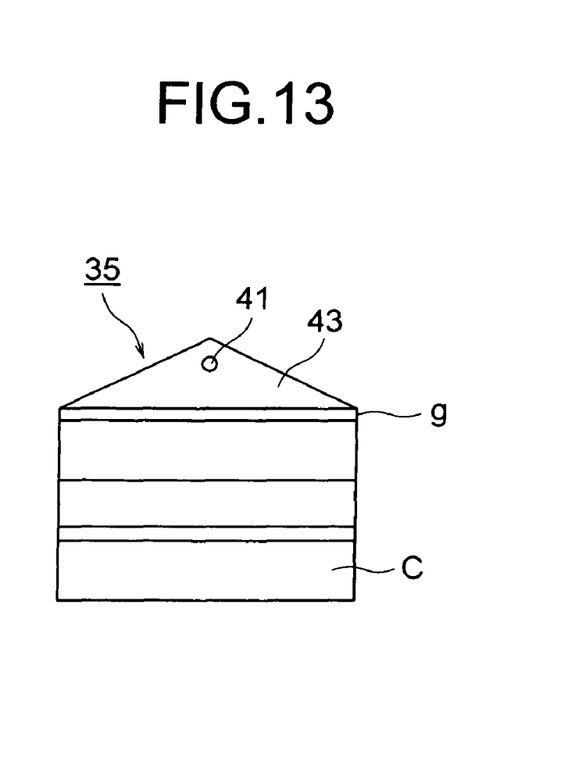
FIG. 13 is a view relating to the embodiment of the present invention and showing pressure distribution within a cavity.

FIG. 11 is a time chart showing a charging method according to the embodiment of the present invention; FIG. 12 is a view relating to the embodiment of the present invention and showing pressure distribution within a runner; and FIG. 13 is a view relating to the embodiment of the present invention and showing pressure distribution within a cavity.

In the present embodiment, speed control and pressure-restricting control are performed during a period between timings t1 and t2 and a period between timings t3 to t6. The injection pressure Sp is restricted such that the injection pressure Sp does not exceed a restriction value Sr1, indicated by an alternate long and short dash line in FIG. 11, during a period between timings t1 and t2 and a restriction value Sr2, also indicated by an alternate long and short dash line in FIG. 11, during a period between timings t3 to t6. Further, during a period between timings t2 and t3, pressure control is performed, while the restriction value Sr1 is used as a target value.

When injection is started at timing t1, velocity control is started, whereby resin fills the sprue 41 and the gate 43 at a speed corresponding to a constant injection speed Sd1, with the consequence that the injection pressure Sp gradually increases.

In an initial state immediately after start of charging near timing t1, the injection pressure Sp assumes a value close to zero. Therefore, the pressure deviation $\Delta Sr$ is large, and the control input Sq is larger than the control input Sy. Unillustrated minimum-value selection processing means (a minimum-value selection processing section) of the command value generator 63 performs minimum-value selection processing to thereby select the control input Sy of the position control system, and outputs it as the speed command Sv. As a result, position control is performed, while the position Sx is used as a target value. When, as the screw 12 is advanced, the injection pressure Sp increases and the pressure deviation $\Delta Sr$ decreases, the magnitude of the control input Sq approaches that of the control input Sy. After that, the injection pressure Sp increases further and the pressure deviation $\Delta Sr$ decreases further, so that at timing t2, the following equation, which serves as the switching condition of the command value generator 63, is satisfied.

$$Sy = Sq$$

When, as the screw 12 is advanced, the injection pressure Sp increases and the control input Sq becomes smaller than the control input Sy, the command value generator 63 selects the control input Sq, whereby pressure-restricting control is performed, while the restriction value Sr is used as a target value.

Subsequently, the resin enters the gate 43 at timing t2. At that time, unillustrated control-input fixing processing means (a control-input fixing processing section) of the command value generator 63 performs control-input fixing processing so as to select the control input Sq of the pressure control system and output it as the speed command Sv. As a result, the pressure control is performed while the restriction value Sr1 is used as a predetermined target value such that the injection pressure Sp becomes the target value.

At that time, the restriction value Sr1 is set such that the injection speed Sd increases gradually. Notably, the injection speed Sd may be gradually increased in the period between timings t2 and t3 by means of setting a restriction value Sr3 as indicated by a broken line in FIG. 11.

Next, when the resin fills the gate narrow portion g at timing t3 and the resin having passed through the gate narrow portion g enters the cavity C, the injection speed Sd is increased sharply to Sd2 (Sd1<Sd2), with the consequence that the injection pressure Sp increases sharply. When the charging of the resin into the cavity C ends at timing t4, in order to prevent generation of a sink mark, burr, etc., the injection speed Sd is reduced to Sd3 (Sd1<Sd3<Sd2), with the consequence that the increase rate of the injection pressure Sp decreases.

Since the restriction value is switched from Sr1 to Sr2 (Sr1<Sr2) at timing t3, the pressure deviation $\Delta$Sr is large, and the control input Sq is larger than the control input Sy. Therefore, the minimum-value selection processing means selects the control input Sy for the position control system, and outputs it as the speed command Sv. As a result, the position control is performed, while the position Sx is used as a target value. In the period between timings t4 and t5 as well, the minimum-value selection processing means selects the control input Sy for the position control system, and outputs it as the speed command Sv. As a result, the position control is performed, while the position Sx is used as a target value.

After that, when the injection pressure Sp increases and the pressure deviation $\Delta$Sr decreases, the magnitude of the control input Sq approaches that of the control input Sy. Then, the injection pressure Sp increases further and the pressure deviation $\Delta$Sr decreases further, so that at timing t5, the following equation, which serves as the switching condition of the command value generator 63, is satisfied.

$$Sy=Sq$$

Consequently, the minimum-value selection processing means selects the control input Sq of the pressure control system, and outputs it as the speed command Sv. As a result, the pressure-restricting control is performed such that the injection pressure does not exceed the restriction value Sr2.

When the pressure-restricting control is started, the injection pressure Sp is restricted not to exceed the restriction value Sr2, with the consequence that the injection speed Sd gradually decreases. At timing t6, VP changeover is performed, and pressure-holding is started, and the control mode is switched from the pressure-restricting control to pressure control.

As described above, in the present embodiment, during the period between timings t2 and t3; i.e., between a time at which the resin enters the gate 43 and a time at which the resin reaches the gate narrow portion g, pressure control is performed such that the injection pressure Sp assumes the restriction value Sr1, which is a constant value. Accordingly, the pressure within the gate narrow portion g becomes stable and uniform, and the resin, which has filled the gate narrow portion g, is prevented from partially flowing into the cavity C at timing t3.

After the resin has entered the cavity C, the pressure within the cavity C becomes stable and uniform.

As a result, molded products are free from defects such as uneven thickness, distortion, warpage, etc., and gas is not generated in the cavity C.

Moreover, since the injection pressure Sp can be maintained at the restriction value Sr1 during the period between timings t2 and t3, resin can be caused to smoothly fill the gate narrow portion g, and a sufficient amount of resin can be charged into the cavity C. As a result, molded products are free from defects such as formation of a sink mark.

The present invention is not limited to the above-described embodiment. Numerous modifications and variations of the present invention are possible in light of the spirit of the present invention, and they are not excluded from the scope of the present invention.

What is claimed is:

1. An injection control apparatus comprising:
   (a) an injection member;
   (b) a drive section for injection which advances and retreats the injection member;
   (c) an injection-speed detection processing section which detects injection speed when injection is performed through advancement of the injection member;
   (d) an injection-pressure detection processing section which detects injection pressure when injection is performed; and
   (e) a drive control processing section which drives the drive section for injection on the basis of the injection speed and the injection pressure to thereby perform pressure control before start of charging of a molding material into a cavity, and speed control after the start of charging of the molding material into the cavity.

2. An injection control apparatus according to claim 1, wherein when a mold apparatus has a narrow portion between a sprue and a cavity, the pressure control is performed when the molding material flows through the narrow portion.

3. An injection control apparatus according to claim 1, wherein the pressure control is performed such that the injection pressure coincides with a predetermined target value.

* * * * *